Nov. 3, 1931.  O. SMITH  1,829,968

TACTILOTESTER

Filed Nov. 16, 1929

Inventor
Oakley Smith,

Witness:

Patented Nov. 3, 1931

1,829,968

UNITED STATES PATENT OFFICE

OAKLEY SMITH, OF CHICAGO, ILLINOIS

TACTILOTESTER

Application filed November 16, 1929. Serial No. 407,647.

My present invention relates to the provision of an instrument which may be styled a tactilotester, that is, an instrument for testing an effort applied through the fingers and rendered appreciable through the sense of touch, and which also may be advantageously employed in training the sense of touch to dependably distinguish differences in the force applied. The physical condition of the ligamentous portions of the body, and tissue generally for that matter, is often ascertainable through its resistance to manipulation, but in order to take advantage of this fact for diagnostic purposes the fingers of the diagnostician must be trained to dependably distinguish through touch differences in resistance which the spinal processes, or other portions of the patient offer to manipulation. It is often desirable for the diagnostician to ascertain what differences in resistance to touch he can dependably distinguish and it is highly desirable to provide facilities for training an operator to dependably distinguish relatively small differences in resistance to touch.

It has been my object to provide such instrumentalities and I have accomplished this object by the structure illustrated in the accompanying drawings in which—

Similar reference characters refer to similar parts throughout the respective views.

Figure 1:
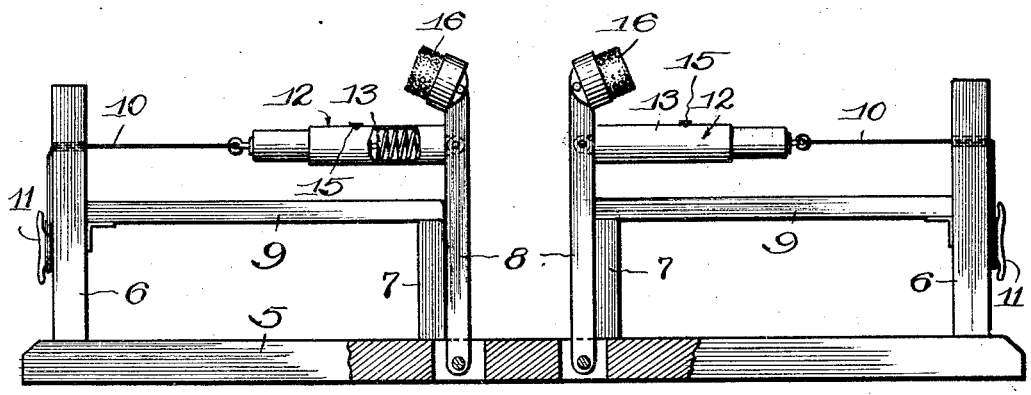
Fig. 1 is an elevation of my tactilotester.

The apparatus conveniently comprises a base 5 from which arise oppositely disposed end columns or pillars 6 and intermediate or central columns or pillars 7. The central columns or pillars 7 are spaced from each other a suitable distance for the mounting of the pivoted arms 8, so that when they extend vertically they will abut the inner faces of the intermediate column 7 and project a convenient distance above them and permit of the arms being swung a desired distance from the vertical toward each other or towards the central line of the instrument. For preventing a lateral give between the upper ends of the intermediate and end columns I interpose between them bracing bars 9. The end columns extend somewhat above the bracing bars 9 and these upwardly extended portions are transversely bored for the passage of tensioning cords 10 which are secured in desired tension by means of cleats 11, or in any other convenient manner. The inner ends of the tensioning cords 10 are connected to the weight attaching ends of spring balances or scales 12. Such spring balances or scales are purchasable in the market and usually comprise a cylindrical casing 13 inside of which is a coil spring secured at one end to one end of the casing and at the opposite end having a hook or other weight attaching means which protrudes from the casing. Such spring scales ordinarily have a slot 14 in the casing through which extends a dog or pointer 15 attached to the free end of the spring, which dog or pointer co-operates with indicia provided on the case adjacent the slot for indicating the weight or tension which the device may be under at any particular time.

The end of the spring balance or scale opposite to its connection with the tensioning cord 10 is pivoted to the upwardly extending pivoted lever 8. The outer faces of the upper ends of the levers 8 are preferably provided with padding 16 of sponge rubber or other suitable material to simulate to some extent the yielding character of the tissues of the body.

In endeavoring to discover a difference in resistance to manipulation of portions of the body, such as a difference in resistance to rotative movements in opposite directions applied to a spinal process, the part may be pressed in one direction with a finger of one hand and in the opposite direction with a finger of the other hand, which permits a comparison of the resistance offered to the movements under almost identical conditions and at immediately succeeding moments of time which greatly facilitates a comparison. I have therefore disposed the lever arms 8 adjacent each other and in a position where one of them may be pressed with a finger of one hand in one direction and the other may be pressed at the same time or immediately thereafter by a finger of the other hand.

The tensioning cords 10 may be adjusted to produce any desired differential in the forces maintaining the lever arms 8 in a vertical position, and this differential may be decreased to a point where the operator fails to distinguish any differential, and by the reading of the scales the operator can be advised of just what difference he can dependably distinguish.

Figure 2:
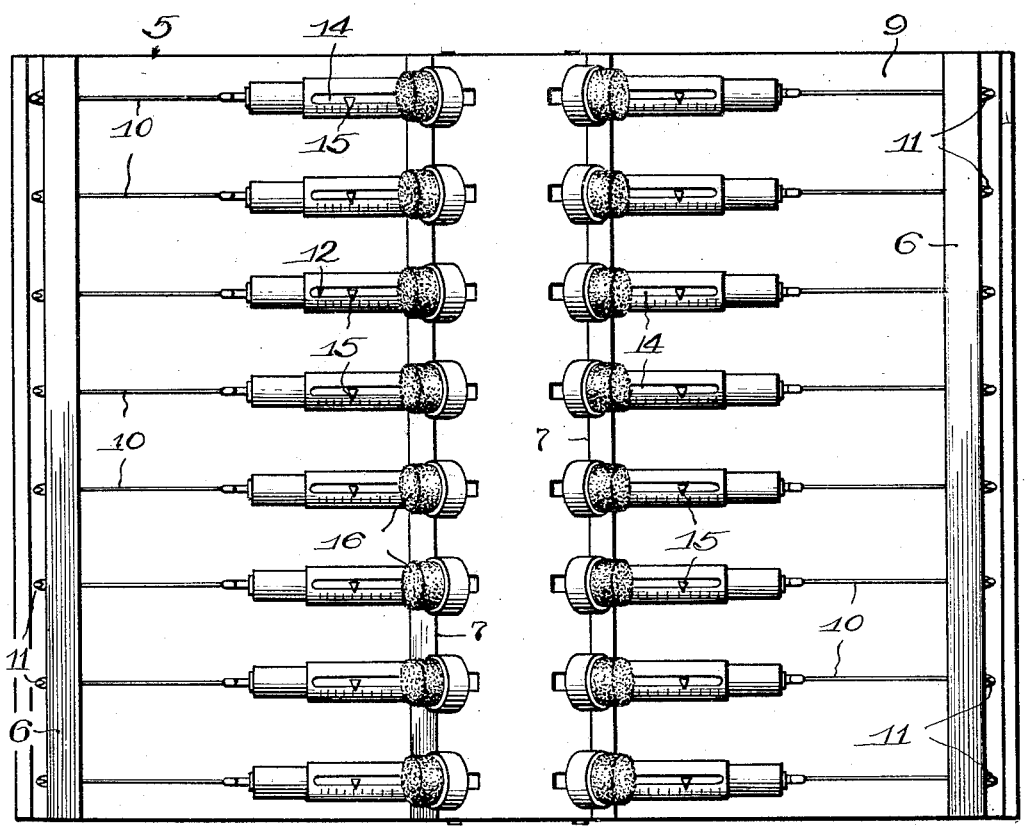
Fig. 2 is a plan thereof.

As will be seen by reference to Fig. 2 I arrange a number of constructions as above described parallel with each other upon the same base and, in teaching, the respective pairs of levers are set at different tensions and the device is covered by means of a sheet or other means to conceal the readings upon the scales of the balances and the students are required to distinguish the differences in tensions of the respective pairs of pivoted arms. These differences being known or ascertainable, the work of the students may be accurately checked and training continued until the students have acquired the power to distinguish dependably relatively slight differences in resistance to manipulation.

Having described my invention what I claim as new and desire to secure by Letters Patent is:

1. A tactilotester comprising a pair of arms pivoted to swing towards each other from a normal position and means comprising a spring and instrumentalities for disclosing the distension thereof for maintaining said respective arms yieldingly in said normal position at measured tensions.

2. A tactilotester comprising a pair of elements having movement from their respective normal positions and means comprising a spring and instrumentalities for disclosing the distension thereof for adjustably maintaining said elements in their normal positions at desired measured tensions.

3. A tactilotester comprising a pair of oppositely disposed elements having movement towards each other from their respective normal positions and means comprising a spring and instrumentalities for disclosing the distention thereof for adjustably maintaining said elements in their normal positions at desired measured tensions.

4. A tactilotester comprising a plurality of pairs of elements having movement from their respective normal positions and means comprising a spring and instrumentalities for disclosing the distention thereof for adjustably maintaining said elements in their normal positions at desired measured tensions.

OAKLEY SMITH.